US 009767277B2

(12) United States Patent
Teglia

(10) Patent No.: US 9,767,277 B2
(45) Date of Patent: *Sep. 19, 2017

(54) DETECTION OF FAULT INJECTIONS IN A RANDOM NUMBER GENERATOR

(71) Applicant: STMicroelectronics (Rousset) SAS, Rousset (FR)

(72) Inventor: Yannick Teglia, Belcodene (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/405,044

(22) Filed: Jan. 12, 2017

(65) Prior Publication Data

US 2017/0124323 A1 May 4, 2017

Related U.S. Application Data

(63) Continuation of application No. 14/299,943, filed on Jun. 9, 2014, now Pat. No. 9,582,664.

(30) Foreign Application Priority Data

Jun. 11, 2013 (FR) ...................................... 13 55354
Jun. 11, 2013 (FR) ...................................... 13 55355

(51) Int. Cl.
*G06G 7/58* (2006.01)
*G06F 21/55* (2013.01)
*G06F 7/58* (2006.01)

(52) U.S. Cl.
CPC ................ *G06F 21/55* (2013.01); *G06F 7/58* (2013.01)

(58) Field of Classification Search
None
See application file for complete search history.

(56) References Cited

U.S. PATENT DOCUMENTS 8,045,381 B2   10/2011   Wuidart
2007/0244951 A1   10/2007   Gressel et al.

OTHER PUBLICATIONS

Bayon et al., "Contactless Electromagnetic Active Attack on Ring Oscillator Based True Random Number Generator," COSADE 2012, pp. 151-166.
Bennett et al., "Privacy Amplification by Public Discussion," *Siam J. Comput.* 17(2):210-229, Apr. 1988.
Böhl et al., "A Fault Attack Robust TRNG," 2012 IEEE 18th International On-Line Testing Symposium (IOLTS), Sitges, Jun. 27-29, 2012, pp. 114-117.
Bucci et al., "A Leakage-Based Random Bit Generator with On-Line Fault Detection," 2006 IEEE Design and Diagnostics of Electronic Circuits and Systems, Prague, Apr. 18-21, 2006, pp. 232-233.
Chor et al., "The Bit Extraction Problem or t-Resilient Functions," 26th Annual Symposium on Foundations of Computer Science, Portland, OR, USA, Oct. 21-23, 1985, pp. 396-407.
Markettos et al., "The Frequency Injection Attack on Ring-Oscillator-Based True Random Number Generators," CHES 2009, pp. 317-331.

(Continued)

*Primary Examiner* — Michael D Yaary
(74) *Attorney, Agent, or Firm* — Seed IP Law Group LLP

(57) ABSTRACT

A method for detecting a fault injection in a circuit, wherein a bit pattern is mixed in a bit stream originating from a noise source and the presence of this pattern is detected in a signal sampled downstream of the mixing.

26 Claims, 3 Drawing Sheets

(56) References Cited

OTHER PUBLICATIONS

Sunar et al., "A Provably Secure True Random Number Generator with Built-In Tolerance to Active Attacks," *IEEE Transactions on Computers* 56(1):109-119, Jan. 2007.

Zhang et al., "Cryptographically Resilient Functions," *IEEE Transactions on Information Theory* 43(5): 1740-1747, Sep. 1997.

Zheng et al., "Breaking Real-World Implementations of Cryptosystems by Manipulating their Random Number Generation," Proceedings of the 1997 Symposium on Cryptography and Information Security, Fukuoka, Japan, Jan. 29-Feb. 1, 1997, 7 pages.

DETECTION OF FAULT INJECTIONS IN A RANDOM NUMBER GENERATOR

BACKGROUND

Technical Field

The present disclosure generally relates to electronic circuits and, more specifically, to circuits using random numbers and including one or several random number generation circuits.

Description of the Related Art

Random or pseudo-random numbers are currently used in encryption or security applications. The use of random numbers facilitates masking data to be protected (for example, secret keys) in digital processings, typically encryption algorithms. Random numbers are also used in ciphered transmission or authentication systems.

For the use of a random number to produce its effects, it must be as little deterministic as possible. Further, it must not be likely to be imposed by an attacker, for example, in the context of a fault injection attack. Indeed, if the random number can be distorted and lose its non-deterministic character, this introduces a weakness in the security of the algorithm exploiting the random number.

It is thus provided to associated processes of verification of the non-deterministic character of the generated numbers to random number generators, for example, by performing statistical tests over a variable depth (in number of bits of the random number).

BRIEF SUMMARY

An embodiment provides a technique for detecting a fault injection attack aiming at the generation of a random number.

An embodiment provides a technique for protecting a random number generation against a fault injection attack.

An embodiment of the present disclosure provides a detection and/or protection technique resisting different types of fault injection attacks.

According to an embodiment, a method for detecting a fault injection in a random number generation circuit is provided, wherein:

a bit pattern is mixed with a bit stream originating from a noise source; and the presence of this pattern is detected in a signal sampled downstream of the mix.

According to an embodiment, one or several bits of the pattern are interposed between one or several bits of the bit stream.

According to an embodiment, a circuit checks the presence of the pattern in said signal.

According to an embodiment, said circuit receives and stores said pattern to detect it in said signal.

According to an embodiment, the pattern is a determined bit sequence.

According to an embodiment, the pattern is a randomly-generated bit sequence.

According to an embodiment, the pattern is a secret key.

According to an embodiment, a random number generation circuit capable of implementing the above method is also provided.

In an embodiment, a method comprises: mixing a bit pattern with a bit stream originating from a noise source to generate a mixed bit sequence; sampling the mixed bit sequence; generating a fault injection signal based on the sampling. In an embodiment, the mixing comprises interposing one or several bits of the bit pattern between one or several bits of the bit stream. In an embodiment, the method includes storing said bit pattern in a circuit configured to perform the sampling. In an embodiment, the bit pattern is a determined bit sequence. In an embodiment, the bit pattern is a randomly generated bit sequence. In an embodiment, the bit pattern is a secret key. In an embodiment, when the fault injection signal indicates the bit pattern is present in the mixed bit sequence, the method comprises generating a random number using the mixed bit sequence. In an embodiment, generating the random number using the mixed bit sequence comprises: encrypting the mixed bit sequence to generate a word; and applying a resilient function to the word to generate the random number.

In an embodiment, a device comprises: a bit mixer configured to mix a bit pattern with a bit stream originating from a noise source to generate a mixed bit sequence; an injection detector configured to sample the mixed bit sequence and determine based on the sampling whether the bit pattern is present in the mixed bit sequence; and a word generator configured to generate a word from the mixed bit sequence. In an embodiment, the bit mixer is configured to interpose one or several bits of the bit pattern between one or several bits of the bit stream. In an embodiment, the injection detector is configured to store said bit pattern. In an embodiment, the bit pattern comprises at least one of: a determined bit sequence; a randomly generated bit sequence; and a secret key. In an embodiment, when the injection detector determines the bit pattern is missing from the mixed bit sequence, the injection detector is configured to generate an indication of an injection attack. In an embodiment, the word generator is configured to generate the word by encrypting the mixed bit sequence. In an embodiment, the device includes: a resilient function block configured to apply a resilient function to the word to generate a random number. In an embodiment, the device includes: a second bit mixer configured to mix a second bit pattern into the mixed bit stream.

In an embodiment, a system comprises: a processor; a memory; and a random number generator configured to generate a random number by: mixing a bit pattern with a bit stream originating from a noise source to generate a mixed bit sequence; sampling the mixed bit sequence; and determining based on the sampling whether the bit pattern is present in the mixed bit sequence. In an embodiment, the random number generator is configured to interpose one or several bits of the bit pattern between one or several bits of the bit stream. In an embodiment, when the random number generator determines the bit pattern is missing from the mixed bit sequence, the random number generator is configured to inhibit generation of the random number. In an embodiment, the random number generator is configured to generate a word by encrypting the mixed bit sequence and to apply a resilient function to the word to generate the random number.

DETAILED DESCRIPTION

Figure 1:
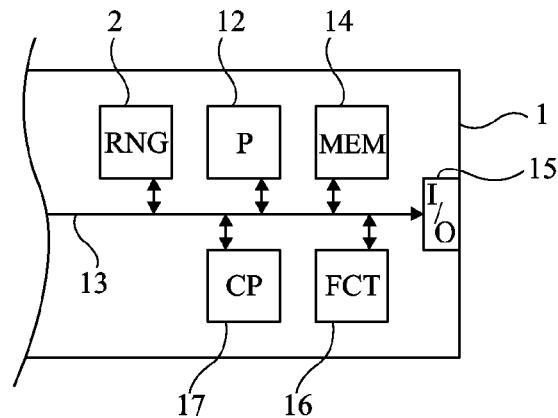
FIG. 1 is a simplified block diagram of an example of electronic circuit of the type to which the embodiments which will be described apply.

In the following description, certain details are set forth in order to provide a thorough understanding of various embodiments of devices, methods and articles. However, one of skill in the art will understand that other embodiments may be practiced without these details. In other instances, well-known structures and methods associated with, for example, signal processing devices, encryption schemes. etc., have not been shown or described in detail in some figures to avoid unnecessarily obscuring descriptions of the embodiments.

Unless the context requires otherwise, throughout the specification and claims which follow, the word "comprise" and variations thereof, such as "comprising," and "comprises," are to be construed in an open, inclusive sense, that is, as "including, but not limited to."

Reference throughout this specification to "one embodiment," "a first embodiment," "an embodiment," etc., means that a particular feature, structure or characteristic described in connection with the embodiment is included in at least one embodiment. Thus, the appearances of the phrases "in one embodiment," or "in an embodiment" in various places throughout this specification are not necessarily referring to the same embodiment, or to all embodiments. Furthermore, the particular features, structures, or characteristics may be combined in any suitable manner in one or more embodiments to obtain further embodiments.

The headings are provided for convenience only, and do not interpret the scope or meaning of this disclosure.

The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not necessarily intended to convey any information regarding the actual shape of particular elements, and have been selected solely for ease of recognition in the drawings.

The same elements have been designated with the same reference numerals in the different drawings, unless the context indicates otherwise. For clarity, only those steps and elements which are useful to the understanding of the embodiments which will be described have been shown and will be detailed. In particular, what use is made of the generated random numbers, be it by a ciphering algorithm, by a ciphered transmission mechanism, or more generally by any electronic circuit has not been detailed, the embodiments which will be described being compatible with current uses of random numbers. Further, the noise sources generally used for random number detection have not been detailed either, embodiments being compatible with any type of noise source usable for random number generation.

Although, in the following description, reference will be made to terminology "random number", it should be understood that these are actually pseudo-random or non-deterministic numbers, the random character of the number being in practice only statistical.

FIG. 1 very schematically shows, in the form of blocks, an example of an electronic circuit 1 of the type to which the embodiments which will be described are likely to apply.

Such a circuit generally comprises a processor 12 (for example, of microcontroller type) capable of communicating, over one or several data, address, and control buses 13, with different electronic circuits of the system. These circuits usually comprise memories 14 (MEM) of volatile or non-volatile type, reprogrammable or not; one or several input/output circuits 15 (I/O) for communicating with different circuits internal and external to the system; and different electronic functions (symbolized in FIG. 1 by a block 16, FCT). These have not been detailed and depend on the application for which circuit 1 is intended.

Circuit 1 also comprises a random number generator 2 (RNG), embodiments of which will be described hereafter. The random numbers generated by circuit 2 are used, for example, by a crypto-processor 17 (CP) intended to implement ciphering or authentication algorithms, etc.

The representation of FIG. 1 is simplified and partial. The system comprising a random generator 2 may comprise multiple analog and/or digital processing circuits.

Figure 2:
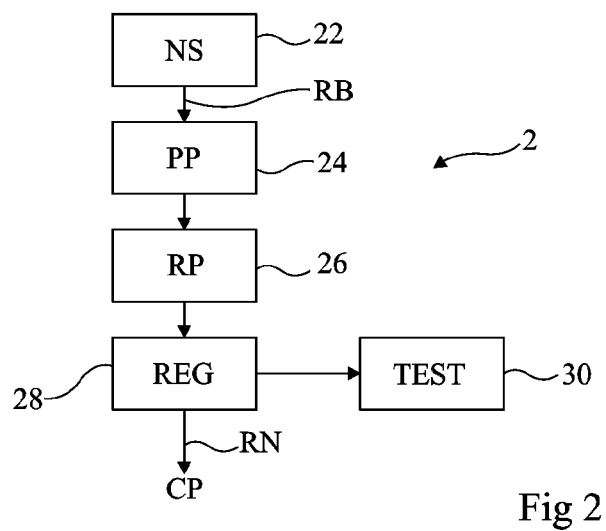
FIG. 2 very schematically illustrates in the form of blocks an example of random number generator.

FIG. 2 is a block diagram of an example of random number generator 2.

Such a generator is based on the use of a noise source 22 (NS). Such a noise source is configured to generate a random signal, ideally as random a signal as possible. Noise source 22 may be based on an analog circuit associated with an analog-to-digital conversion to provide a succession of states on a digital signal RB representing bits of value 0 or 1. The noise source is, for example, a ring oscillator, with or without a phase-locked loop (PLL).

Bit stream RB is submitted to a post-processing 24 (PP) configured to equitably distribute, on the output bits, the entropy of the bit stream generated by the noise source.

The bit stream is then shaped (block 26, RP) according to the application to distribute the bits in groups of bits intended for this application.

Finally, the bits are grouped in words to form random numbers RN and are placed in an output register 28 (REG) capable of being read, for example, by encryption processor 17 (FIG. 1).

Generally, a statistic test 30 is carried out on the groups of bits contained in register 28.

Figure 3:
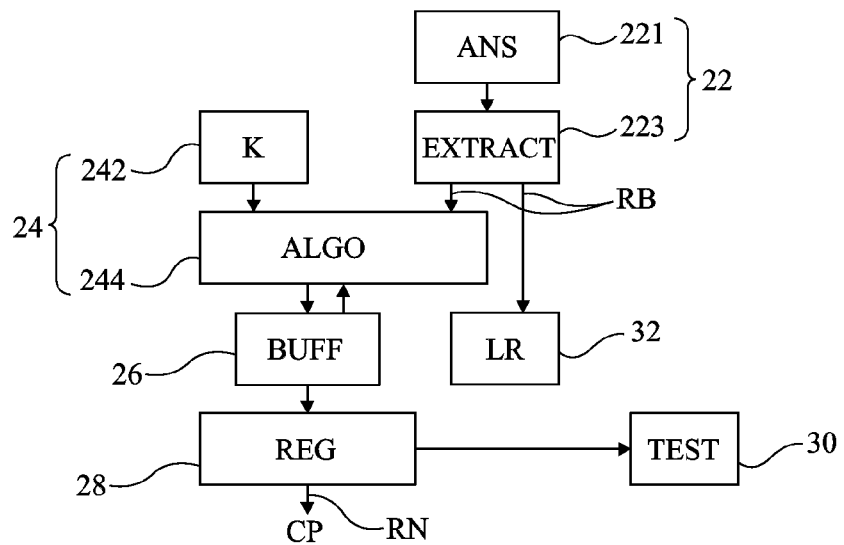
FIG. 3 very schematically illustrates in the form of blocks another more detailed example of random number generator.

FIG. 3 very schematically shows in the form of blocks a more detailed example of a random generation chain illustrating, in particular, an example of post-processing.

In the example of FIG. 3, noise source 22 is divided into an analog noise source 221 (ANS) followed by an extraction circuit 223 (EXTRACT) configured to extract a bit stream from the analog noise.

The bits provided by noise source 22 are submitted to a post-processing 24 formed, in this example, of an encryption algorithm (block 244, ALGO) exploiting a key (block 242, K), which may be secret, to cipher the bit stream. Shaping circuit 26 then is a buffer (BUFF), exploited by the encryption algorithm, for example, to store the intermediate results of the different ciphering rounds. The content of memory 26 is transferred into register 28 at the end of the processing.

In the example of FIG. 3, an additional test 32 (LR) is carried out in parallel with the encryption processing. This additional test may take various forms, for example, a verification of the fact that the states of the bits of stream RB provided by the source do not remain at 1 or 0 for too long.

Usual countermeasures against attempts to inject faults in order to distort the random character of the generated bit stream exploit either statistical test 30, or test 32.

A first category of faults capable of affecting a random generator is the injection of a specific frequency at the level of the noise source, especially if said source is formed by a ring oscillator. The attacker's aim then is to stabilize the frequency of the ring oscillator, which enables him to impose the output value of the bit flow. Such an attack is typically detected due to test 32 which then detects that the output provides bits at state 1 or 0 for a determined time period.

However, such an attack is not detectable at the level of the actual generated number, that is, after the algorithmic post-processing.

The resistance of the noise source is generally improved by using a phase-locked loop which avoids a stabilization of the frequency of the ring oscillator.

Another category of attacks capable of affecting a random number generator is an attack by fault injection in the form of pulses, where the attacker injects, downstream of the noise source, a short disturbing pulse (of Dirac pulse type). Such a disturbance is then no longer detectable by the test verifying the successive states of the bits (test 32) since it only impacts a small portion of the bit stream. Such an attack may also be implemented at the end of the ciphering algorithm (at the level of buffer 26) and is then not detectable for usual tests.

According to an embodiment, a mechanism for detecting an intentional or incidental disturbance on a random number generator is provided.

Figure 4:
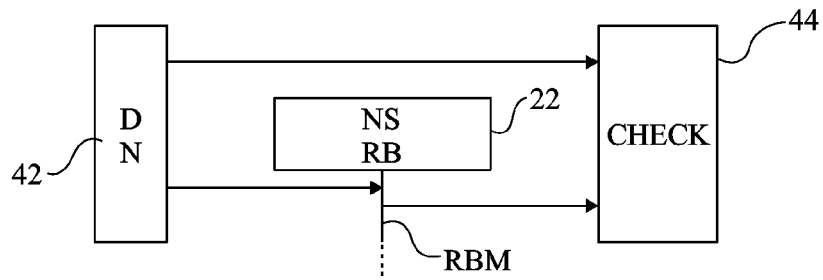
FIG. 4 very schematically shows in the form of blocks an embodiment of a method for detecting a fault injection in a random number generator according to an embodiment.

FIG. 4 illustrates, in the form of blocks, an embodiment of a method for detecting a fault injection attack.

According to this embodiment, it is provided to interpose in the bit stream, downstream of noise source 22, for example, after extraction circuit 223 (FIG. 3), a pattern (block 42, DN), for example, a determined bit sequence. This pattern is, in parallel, provided to a checking entity 44 (CHECK) which also receives the signal on which pattern DN has been injected. The function of entity 44 is to check that pattern DN is actually in the signal where this pattern has been injected. In the case of an attack by fault injection in the form of pulses which targets the combinational logic of the circuit, pattern DN will be distorted in the same way as the signal generated by the noise source. Accordingly, if circuit 44 does not find pattern 42, this means the presence of a fault.

The injection of pattern 42 corresponds to interposing bits between the bits of stream RB generated by source 22.

Pattern DN may be fixed, variable, secret or not. It may itself be formed of a random pattern since its value is stored in circuit 44 for verification. The size and the distribution of the pattern in the bit stream are selected according to the expected capacity of the attacker. For example, if it is considered that an attacker's fault will be distributed over n bits, it is ascertained that at most n-1 bits of stream RB are present between two patterns. Thus, a fault will affect at least one bit of the pattern (at worst the n-1 random bits and one bit of the pattern) and will be detected. If an attacker is capable of injecting a fault on a single bit, he will however be forced to repeat this fault injection to obtain a usable result. An uneven distribution of the pattern then enables to detect the attack since the attacker would then have to know this distribution. The way to interpose the pattern bits in the bits of the random flow may vary, in fixed or random fashion. According to various examples, it may be provided to interpose a bit of pattern DN every two bits of stream RB, to alternate the bits of stream RB and those of pattern DN one by one, two by two, etc., to insert two bits of pattern DN for one bit of stream RB, or conversely, etc.

Figure 5:
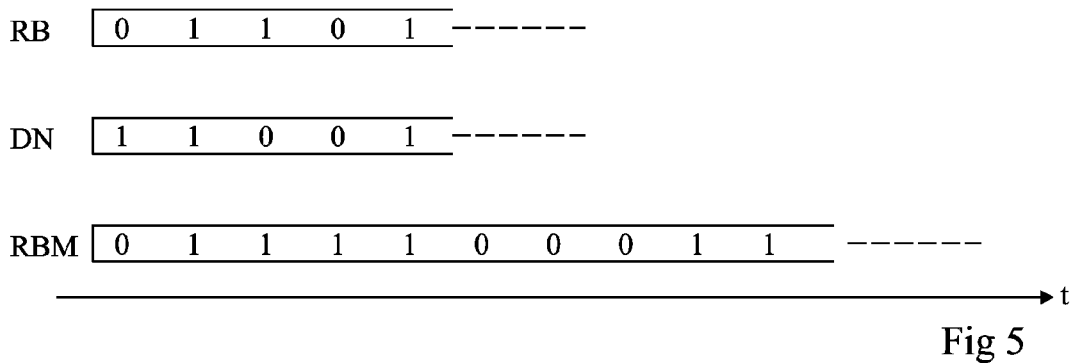
FIG. 5 illustrates the operation of the detection mechanism of FIG. 4.

FIG. 5 illustrates, in the form of timing diagrams showing bits sequences, the operation of the protection mechanism of FIG. 4. Noise source 22 is assumed to natively generate a series RB of bits 01101, etc. It is also assumed that pattern DN is formed by bit sequence bits 11001. The detection mechanism comprises, in this example, interposing one bit out of two of the pattern with one bit out of two of the noise source. Accordingly, the signal present downstream of the noise source contains sequence 0111100011, etc. Knowing pattern DN and its distribution rule in bit stream RB, circuit 44 is capable of checking that the pattern is still present in the resulting modified stream RBM and, thus, of detecting whether a fault has been injected into the signal.

In an embodiment, the period with which the bits of the pattern are interposed may be adapted to the expected type of attack. For example, considering that an attacker has the power of changing n bits, the bit streams are interrupted at least every n-1 bits by one or several bits of pattern DN. Considering that the attacker may only change a single bit, the insertion diagram of the pattern in bit stream RB may be tried to be kept secret.

It could have been thought that the introduction of a pattern, and in particular of a determined repetitive pattern, downstream of the noise source, would adversely affect the random character of the generated number. However, due to its insertion in the random bit flow, and especially due to the post-processing applied before provision of the random number, the introduction of this pattern is in practice not disturbing. As a variation, the pattern is suppressed from the bit stream just as it is proceeded to the post-processing.

Figure 6:
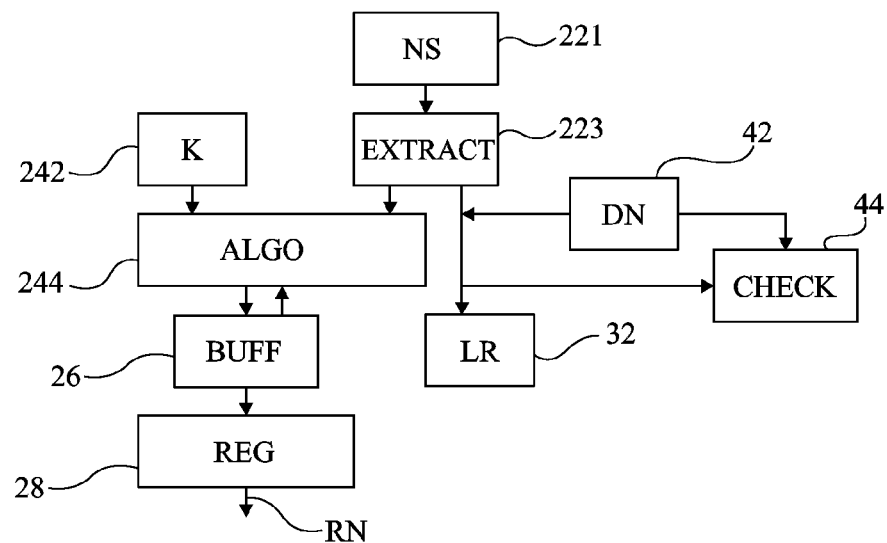
FIG. 6 very schematically shows a variation of the detection method.

FIG. 6 very schematically shows in the form of blocks another embodiment according to which pattern DN instead of being injected at the level of noise source 22, is injected further downstream, for example, before test 32. In this case, circuit 44 samples the signal also before test 32 to check the presence of the pattern. Function 223 may indeed modify the bit stream.

It may be provided to interpose bits in several locations of the circuit. Either several checking circuits 44, or a single circuit 44 which samples the signal from the most downstream position in the bit path, are then provided, on the condition of being able, at the level of circuit 44, of locating the pattern(s).

Interposing the bits between other bits in a signal poses no specific problem. Indeed, this amounts to sampling the signal from the conductor (between the two circuits) where the injection is desired to be performed. For example, a shift register containing the bits of pattern DN, controlled by a counter, may be used. Every k (k greater than or equal to 1) bits of stream RB, a sequence of t bits (t greater than or equal to 1) of pattern DN is added. To perform the injection at a variable frequency, an array of several values of k (different steps) and of several patterns respectively assigned to the different steps may be provided, and it may be provided to sequentially or randomly select the different pairs (k, t).

In an embodiment, a mechanism for protecting a random number generation against a fault injection is provided.

Figure 7:
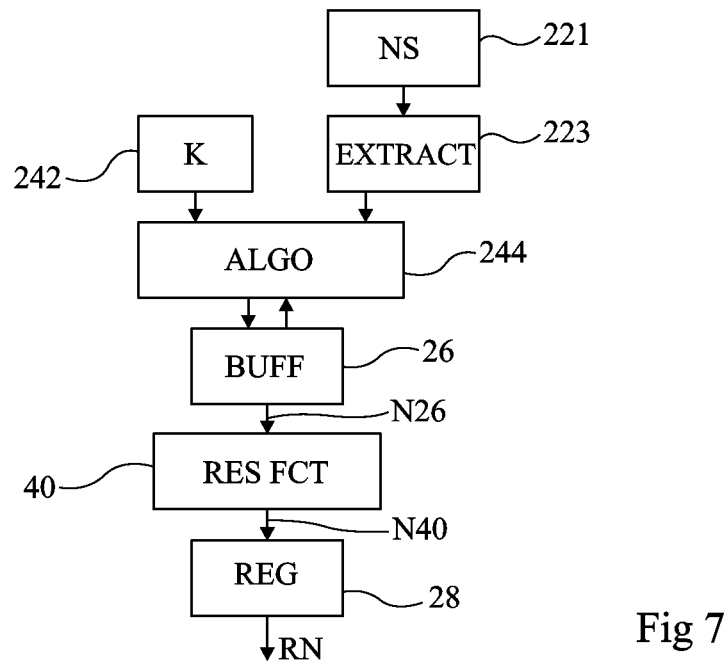
FIG. 7 very schematically shows in the form of blocks an embodiment of a method for protecting a random number generator against fault injections.

FIG. 7 very schematically shows in the form of blocks an embodiment of a method for detecting a fault injection in a random number generator.

This embodiment applies to the generator type of FIG. 3, where bit stream RB, extracted from the noise source, is processed by an encryption algorithm.

It is provided to interpose, between output buffer 26 and register 28 of generated random numbers, a resilient function (block 40, RES FCT). A resilient function is characterized by the fact that based on a number of input bits, it provides an equal or different number of output bits and provides the uniform distribution of these bits. Generically, a resilient function is noted f(n, m, t), where n designates the number of input bits, m the number of output bits, and t the number of bits having a modified value. In a binary system, saying that the bits are modified means that their value is inverted.

For example, functions such as defined in article "The bit extraction problem or t-resilient functions," by B. Chor, O. Goldreich, J. Hastad, J. Friedman, S. Rudich, and R. Smolensky, published in IEEE Symp. on Foundations of Computer Science, 1985, vol. 26, pp. 396-407, or in article "Privacy amplification by public discussion" by C. H. Bennett, G. Brassard, and J. NI. Robert, published in SIAM J. Comput., vol. 17, pp. 210-229, 1988 may be used.

Figure 8:
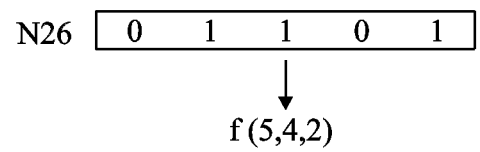
FIG. 8 illustrates the operation of the protection mechanism of FIG. 7.
Figure 8:
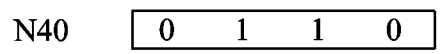

FIG. 8 schematically illustrates an embodiment where a function f(5, 4, 2) is applied. This example considers a word N26 of 5 bits 01101 at the input (output of buffer 26), transformed into a word N40 of 4 bits 0110 at the output, the value of two of the bits being inverted.

Resilient functions capable of being used include encryption functions. However, in this case, conversely to a usual system of the type illustrated in FIG. 3, this amounts to successively applying two encryption algorithms, respectively between the extraction of the random bit stream and the buffer, and between this buffer and the output register.

In the presence of a pulse fault injection, the attacker would have to change the state of a sufficient number of bits so that the function can no longer be resilient, short of which the attack will not work. In practice, the degree of resilience of the function will be selected by taking into account the attacks which are desired to be blocked.

The parameters selected for the resilient function (number of input bits, number of output bits, and number of modified bits) depend on the application and on the robustness desired for the protection mechanism. For example, if t is the number of changes authorized by the function, that is, the number below which the outputs are always balanced, a function having a parameter t greater than the number of changes which are considered possible from the attacker is selected.

The detection and protection mechanisms may be combined.

Various embodiments have been described, various alterations and modifications will occur to those skilled in the art. In particular, the selection of the pattern and of its size may depend on the application and, on the capacity of the random number generation circuit. Further, the exploitation of the performed detection may take various usual forms (alert, circuit locking, etc.). Further, the practical implementation of the described embodiments is within the abilities of those skilled in the art based on the functional indications by using hardware or software tools usual per se.

Such alterations, modifications, and improvements are intended to be part of this disclosure, and are intended to be within the spirit and the scope of the present disclosure. Accordingly, the foregoing description is by way of example only and is not intended to be limiting.

Some embodiments may take the form of or include computer program products. For example, according to one embodiment there is provided a computer readable medium including a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some of the systems and/or modules and/or circuits and/or blocks may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   mixing a bit pattern with a bit stream originating from a noise source to generate a mixed bit sequence;
   sampling the mixed bit sequence to detect the bit pattern in the mixed bit sequence;
   detecting fault injection based on whether the sampling detects the bit pattern in the mixed hit sequence; and
   taking one or more actions to protect a circuit in response to detection of fault injection.

2. The method of claim 1 wherein when the bit pattern is present in the mixed bit sequence, the method comprises generating a random number using the mixed bit sequence.

3. The method of claim 2 wherein generating the random number using the mixed bit sequence comprises:
   encrypting the mixed bit sequence to generate a word; and
   applying a resilient function to the word to generate the random number.

4. The method of claim I wherein the detecting fault injection comprises detecting fault injection when the sampling does not detect the bit pattern in the mixed bit sequence.

5. The method of claim 1 wherein the one or more actions comprises inhibiting one or more operations in response to detection of fault injection.

6. The method of claim 1 wherein when fault injection is not detected, the method comprises performing at least one of an encryption operation and a decryption operation based at least part of the mixed bit sequence.

7. A device, comprising:
   a bit mixer, which, in operation, mixes a bit pattern with a bit stream originating from a noise source to generate a mixed bit sequence;

circuitry, which, in operation,
  samples the mixed bit sequence;
  generates a signal indicating detection of fault injection based on whether the sampling indicates the bit pattern is present in the mixed bit sequence; and
  selectively takes one or more actions based on the generated signal indicating detection of fault injection.

8. The device of claim 7 wherein the bit mixer is configured to interpose one or several bits of the bit pattern between one or several bits of the bit stream.

9. The device of claim 7 wherein the circuitry is configured to store said bit pattern.

10. The device of claim 7 wherein the bit pattern comprises at least one of:
  a determined bit sequence;
  a randomly generated bit sequence; and
  a secret key.

11. The device of claim 7 wherein when the bit pattern is missing from the mixed bit sequence, the generated signal indicates fault injection has been detected.

12. The device of claim 7 wherein the circuitry, in operation, generates a word when the generated signal does not indicate detection of fault injection.

13. The device of claim 12 wherein the generating the word comprises using at least part of the mixed bit sequence.

14. The device of claim 13 wherein the circuitry, in operation, generates a random number based on the generated word.

15. The device of claim 14 wherein the circuitry, in operation, applies a resilient function to the word to generate the random number.

16. The device of claim 7 wherein the circuitry, in operation, generates a random number based on whether the generated signal indicates detection of fault injection.

17. The device of claim 7, comprising:
  a second bit mixer configured to mix a second bit pattern into the mixed bit stream.

18. The device of claim 7 wherein the one or more actions comprises inhibiting one or more functions of the circuitry when the generated signal indicates fault injection has been detected.

19. The device of claim 7 wherein the circuitry, in operation, performs at least one of an encryption operation and a decryption operation based on at least part of the mixed bit sequence when the generated signal does not indicate detection of fault injection.

20. A system, comprising:
  a noise source, which, in operation, generates a bit stream; and
  circuitry, which, in operation:
    mixes a bit pattern with the bit stream to generate a mixed bit sequence;
    samples the mixed bit sequence;
    detects fault injection based on whether the sampling indicates the bit pattern is present in the mixed bit sequence; and
    selectively takes one or more actions based on whether fault injection is detected.

21. The system of claim 20 wherein the circuitry, in operation:
  generates a random number when fault injection is not detected; and
  inhibits random number generation when fault injection is detected.

22. The system of claim 20 wherein the circuitry, in operation:
  performs a cryptographic operation when fault injection is not detected; and
  inhibits cryptographic operations when fault injection is detected.

23. The system of claim 20 comprising an integrated circuit including the circuitry and the noise source.

24. A non-transitory computer-readable medium having contents which configure a processing device to perform a method, the method comprising:
  mixing a bit pattern with a bit stream originating from a noise source to generate a mixed bit sequence;
  sampling the mixed bit sequence to detect the bit pattern in the mixed bit sequence;
  detecting fault injection based on whether the sampling detects the bit pattern in the mixed bit sequence; and
  selectively taking one or more actions based on whether fault injection is detected.

25. The non-transitory computer-readable medium of claim 24 wherein the method comprises at least one of:
  inhibiting one or more functions of the processing device when fault injection is detected;
  generating a random number based on at least part of the mixed bit sequence when fault injection is not detected;
  generating a word based on at least part of the mixed bit sequence when fault injection is not detected; and
  performing a cryptographic operation using at least part of the mixed bit sequence when fault injection is not detected.

26. The non-transitory computer-readable medium of claim 24 wherein the detecting fault injection comprises detecting fault injection when the sampling does not detect the bit pattern in the mixed bit sequence.

* * * * *